US008260875B2

(12) United States Patent
Bates

(10) Patent No.: US 8,260,875 B2
(45) Date of Patent: Sep. 4, 2012

(54) ENTERTAINMENT DEVICE, ENTERTAINMENT SYSTEM AND METHOD FOR REPRODUCING MEDIA ITEMS

(75) Inventor: Richard Elliot Bates, London (GB)

(73) Assignee: Sony Computer Entertainment Europe Limited (GB)

( * ) Notice: Subject to any disclaimer, the term of this patent is extended or adjusted under 35 U.S.C. 154(b) by 966 days.

(21) Appl. No.: 12/257,613

(22) Filed: Oct. 24, 2008

(65) Prior Publication Data

US 2009/0123899 A1 May 14, 2009

(30) Foreign Application Priority Data

Oct. 26, 2007 (EP) ..................................... 07254242

(51) Int. Cl.
*G06F 15/16* (2006.01)
*G09B 5/00* (2006.01)

(52) U.S. Cl. ........................................ 709/217; 434/307

(58) Field of Classification Search .......... 709/217–219, 709/227–229, 231; 725/114, 115; 434/307
See application file for complete search history.

(56) References Cited

U.S. PATENT DOCUMENTS

| | | | | |
|---|---|---|---|---|
| 6,356,914 | B1 * | 3/2002 | deCarmo et al. | 1/1 |
| 7,451,253 | B2 * | 11/2008 | Kim et al. | 710/38 |
| 2004/0255340 | A1 * | 12/2004 | Logan | 725/145 |
| 2005/0117466 | A1 | 6/2005 | Strachota | |
| 2006/0030408 | A1 | 2/2006 | Kiiskinen | |
| 2006/0117365 | A1 * | 6/2006 | Ueda et al. | 725/112 |
| 2006/0292537 | A1 * | 12/2006 | Nute et al. | 434/307 A |

FOREIGN PATENT DOCUMENTS

| | | |
|---|---|---|
| EP | 1 426 952 | 6/2004 |
| EP | 1 548 740 | 6/2005 |
| EP | 1 610 325 | 12/2005 |
| WO | 99/34564 | 7/1999 |

OTHER PUBLICATIONS

European Search Report dated Apr. 24, 2008, from the corresponding European Application.
"Bexy- iMirror (TM) Wireless Remote Control Docking Station for iPod" Retrieved from http://www.bexyusa.com/iMirror.htm, Oct. 9, 2007.
"Signal—The Ultimate Media Player Remote" Retrieved from http://www.alloysoft.com, Oct. 9, 2007.
"Zicplay out to wow with Ewoo wireless iPod remote" Retrieved from http://www.reghardware.co.uk/2007/03/08/zicplay_woos_with_ewoo/print.html, Aug. 24, 2007.

* cited by examiner

*Primary Examiner* — Shirley Zhang
(74) *Attorney, Agent, or Firm* — Lerner, David, Littenberg, Krumholz & Mentlik, LLP

(57) ABSTRACT

A method for reproducing media items using a first entertainment device is provided. The first entertainment device communicates with a portable entertainment device via a wireless link. The method includes reproducing a first media item using media reproduction means; generating a media list of one or more media items for reproduction by the first entertainment device; collating the media list at the first entertainment device; designating a second media item as the next media item to be reproduced by the media reproduction means after completion of the reproduction of the first media item; and detecting whether the second media item is stored on the first removable storage medium. If the second media item is not stored thereon, the method includes storing media data relating to the first media item on a local storage medium for reproduction in dependence upon the media data stored in the local storage medium.

22 Claims, 9 Drawing Sheets

ENTERTAINMENT DEVICE, ENTERTAINMENT SYSTEM AND METHOD FOR REPRODUCING MEDIA ITEMS

BACKGROUND OF THE INVENTION

1. Field of the Invention

The present invention relates to an entertainment device, entertainment system and method for reproducing media items.

2. Description of the Prior Art

Karaoke games such as the Singstar® game published by Sony Computer Entertainment Europe® for the Sony® Playstation series of entertainment device are becoming increasingly popular. In such games, a user sings along to the backing track into a microphone connected to an entertainment device in accordance with lyrics displayed on a display screen. The entertainment device may then use the input from the microphone to generate a game score that indicates how well the user has sung the song. In this way, users may compete against each other to see who can achieve the highest score or to see who can successfully perform the most difficult song.

However, during the playing of a karaoke game, a user typically selects a track or tracks that they wish to perform using the entertainment device. Once a user has reached the end of performing a song or songs that they have selected, if the user or users of the game wish to continue playing the game, they must select another song from a list of available songs using the entertainment device. This can break up the flow of the game due to the pause that may ensue when selecting a new song.

Remote control devices such as the iMirror remote manufactured by Bexy (see http://www.bexyusa.com/iMirror.htm) for portable music players such the Apple® iPod® are available which allow a user to queue songs to generate a playlist and control many of the functions of the portable music player. However, although remote control devices for karaoke entertainment devices are known which allow a user to preselect tracks or compile a playlist of tracks to sing, these devices suffer from limited functionality as their main purpose is to allow a user to select tracks to be played out by the karaoke entertainment device. Additionally, where songs are stored on removable storage media such as a compact disc read-only-memory (CD-ROM), a digital video disc read-only memory (DVD-ROM) or a Blu-Ray® disc read-only-memory (BD-ROM), a situation may arise in which a song that a user wishes to perform next may not be stored on the same removable storage media as the song that is currently being played out by the entertainment device.

Therefore, when the user finishes singing the song, the current removable storage medium must be swapped with another removable storage medium, on which the next song is stored, so that the entertainment device can reproduce the next song. This can be a time consuming process which may impede the flow of the game as the media are swapped with each other. This is particularly relevant if the songs are stored on CD-ROM, DVD-ROM or BD-ROM where, in addition to the time spent by a user in physically swapping the discs, there may a relatively long seek time to find the track that the user wishes to perform. This delay in reproducing the next track can be frustrating for a user especially during a period of exciting and competitive game play.

It is an object of the present invention to alleviate or mitigate the above problems.

SUMMARY OF THE INVENTION

In a first aspect, there is provided a method for reproducing media items using a first entertainment device, the first entertainment device being operable to communicate with a portable entertainment device via a wireless communication link, and the first entertainment device comprising media reproduction means operable to reproduce one or more media items stored on a removable storage medium, the method comprising:

reproducing a first media item using the media reproduction means, the first media item being stored on a first removable storage medium;

generating, using a user interface associated with the portable entertainment device, a media list of one or more media items for reproduction by the first entertainment device;

collating the media list at the first entertainment device, whilst the first media item is being reproduced by the media reproduction means;

designating, at the first entertainment device, a second media item as the next media item to be reproduced by the media reproduction means after completion of the reproduction of the first media item, the second media item being selected from the media list collated at the first entertainment device; and detecting, whilst the first media item is being reproduced by the media reproduction means, whether the second media item is stored on the first removable storage medium, and, if the second media item is detected as not being stored on the first removable storage medium, storing media data relating to the first media item to a local storage medium, so that the first media item may be reproduced in dependence upon the media data stored in the local storage medium to allow the first removable storage medium to be exchanged with a second removable storage medium associated with the second media item whilst the first media item is being reproduced by the media reproduction means.

Further respective aspects and features of the invention are defined in the appended claims.

By using a portable device to generate a media list of media items for reproduction by an entertainment device and transmitting the media list from the portable device to the entertainment device, a delay caused by selecting a media item after completion of a first media item may be reduced. Furthermore, by storing media data relating to a first media item stored on a first removable storage medium to local storage whilst the first media, item is being reproduced, the first removable storage medium may be swapped or exchanged with a different removable storage medium without interrupting playback of the first media item. Therefore, a delay caused by swapping between the storage mediums after completion of reproduction of the first media item may be reduced, because the second media item may be made accessible to the entertainment device before playback of the first media item has completed.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

An entertainment device, entertainment system and method for reproducing media items disclosed. In the following description, a number of specific details are presented in order to provide a thorough understanding of embodiments of the present invention. It will be apparent however to a person skilled in the art that these specific details need not be employed to practice the present invention. Conversely, specific details known to the person skilled in the art are omitted for the purposes of clarity in presenting the embodiments.

Figure 1A:
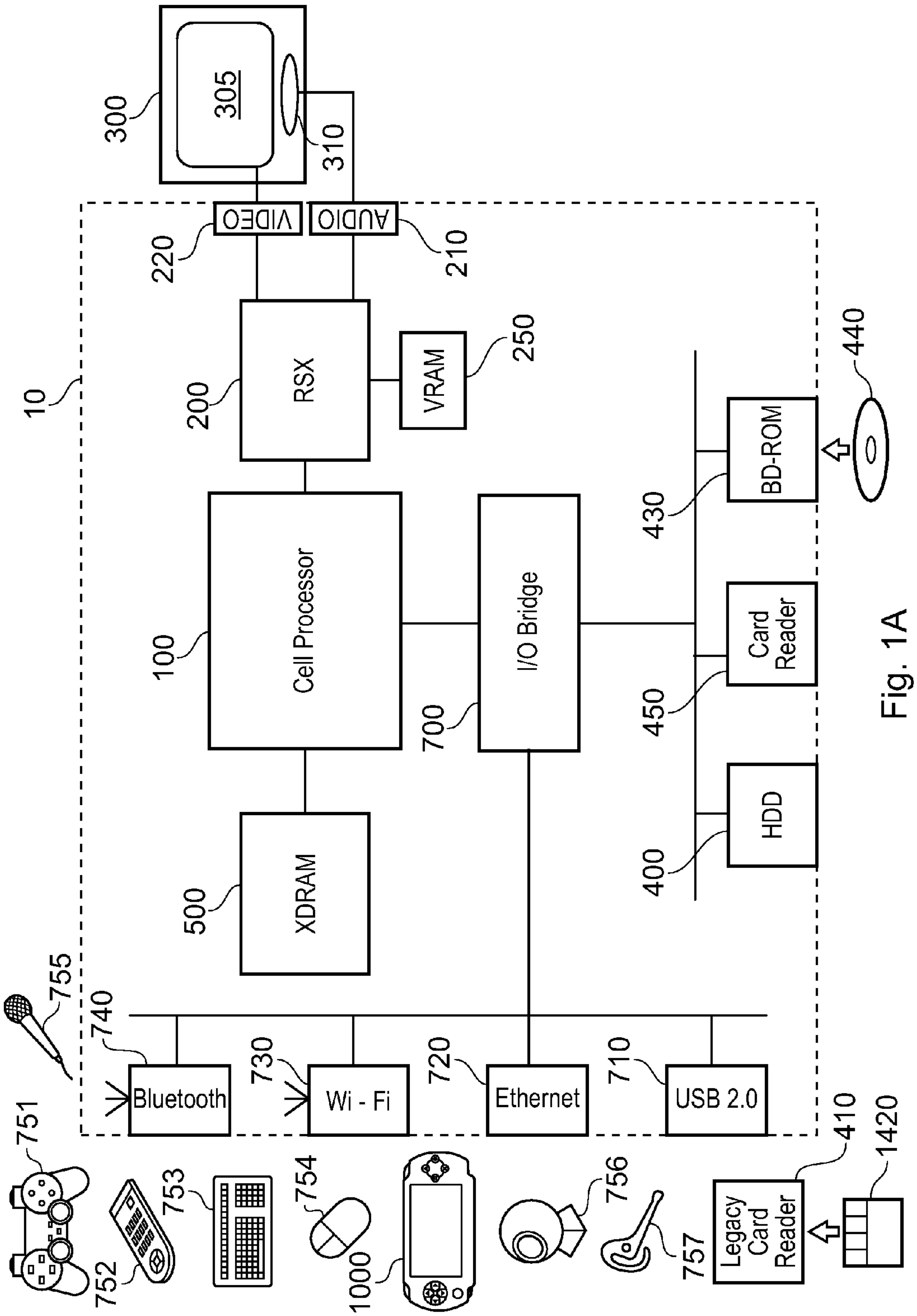
FIG. 1A is a schematic diagram of an entertainment device.

FIG. 1A schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a microphone 755 such as those supplied with the SingStar® karaoke game published by Sony Computer Entertainment Europe®; a portable entertainment device 1000 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 1000 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 1B:
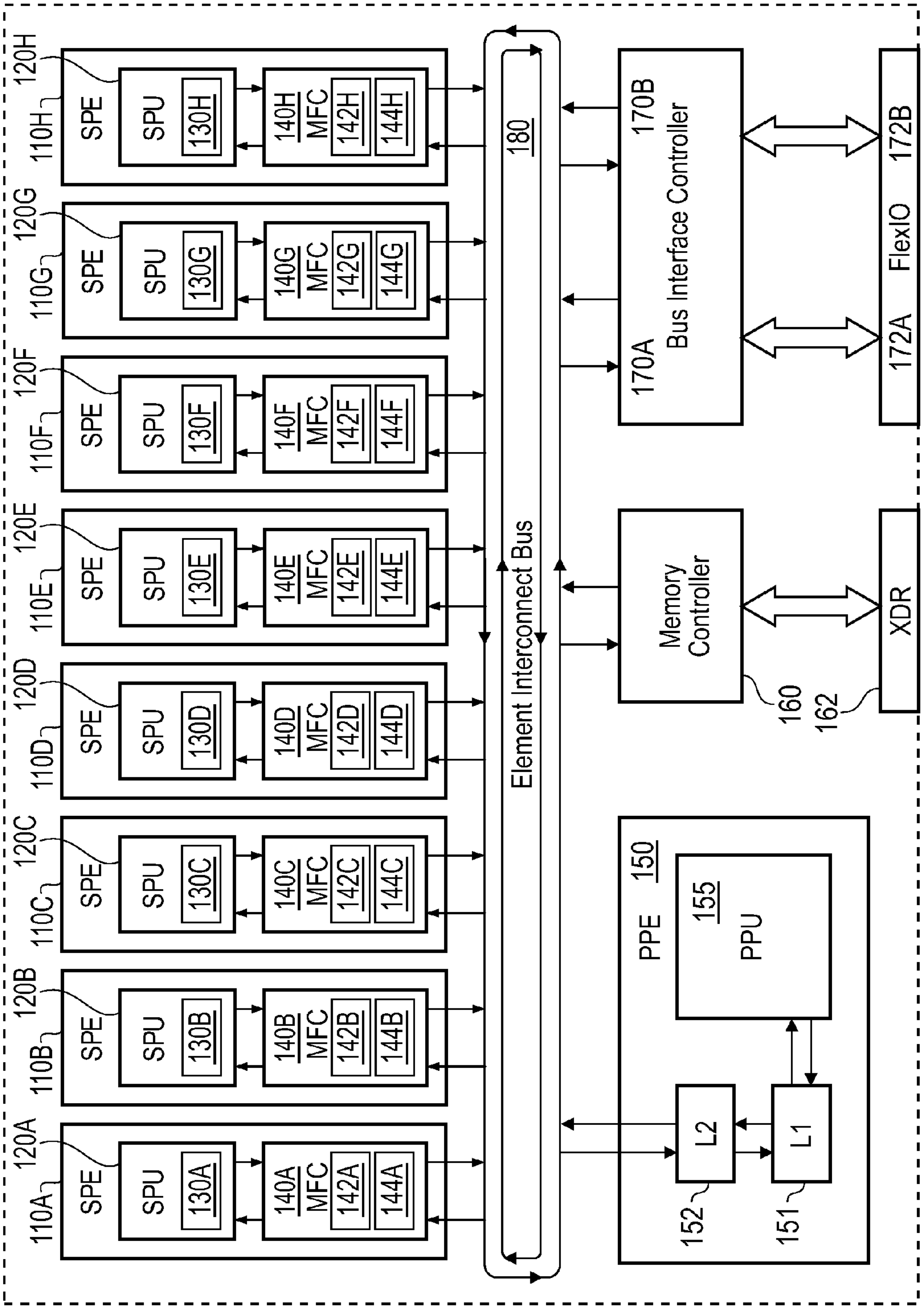
FIG. 1B is a schematic diagram of a cell processor.

Referring now to FIG. 1B, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 1C:
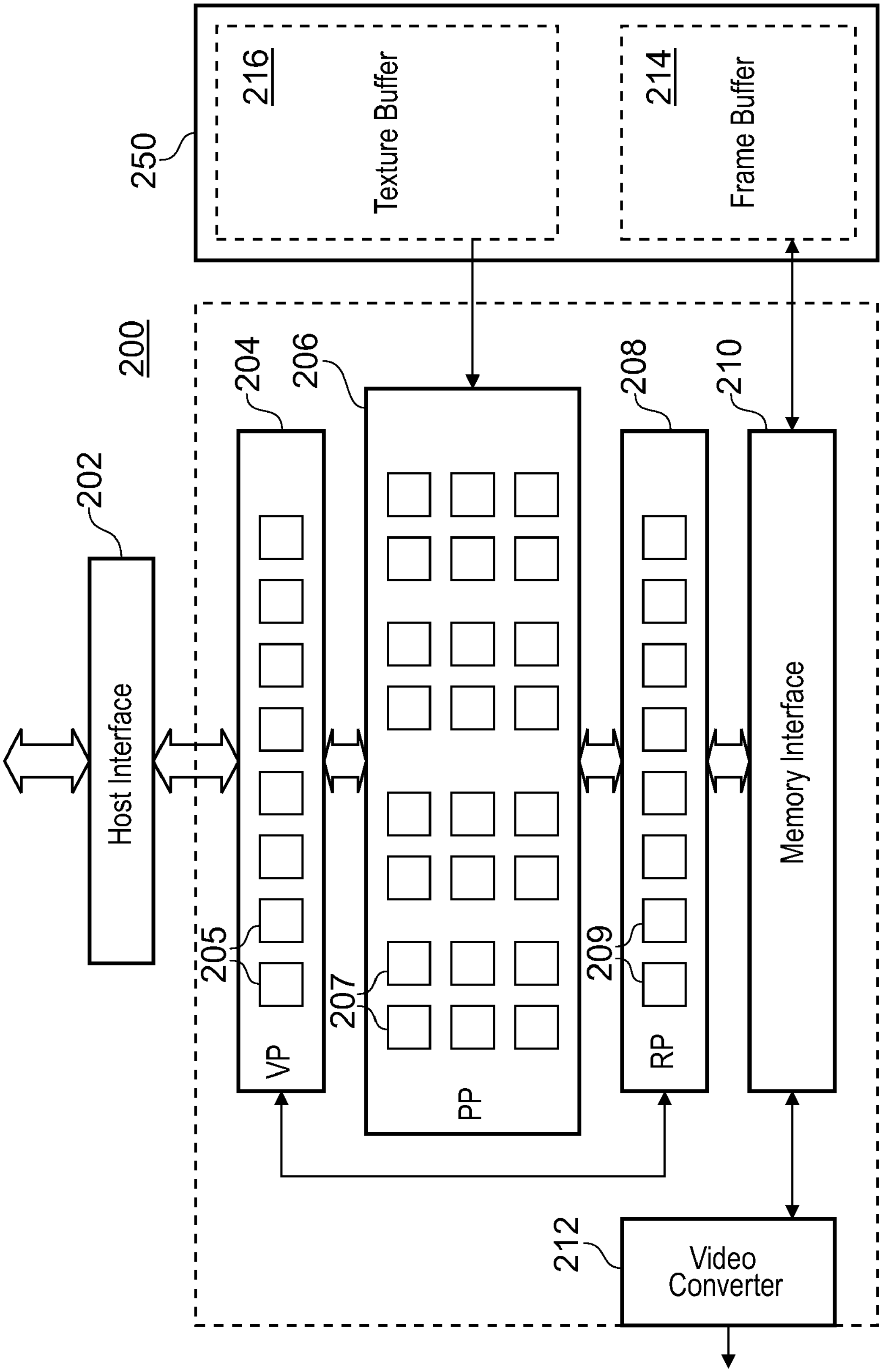
FIG. 1C is a schematic diagram of a video graphics processor.

Referring now to FIG. 1C, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

A portable entertainment device will now be described with reference to FIGS. 2A, 2B and 2C.

Figure 2A:
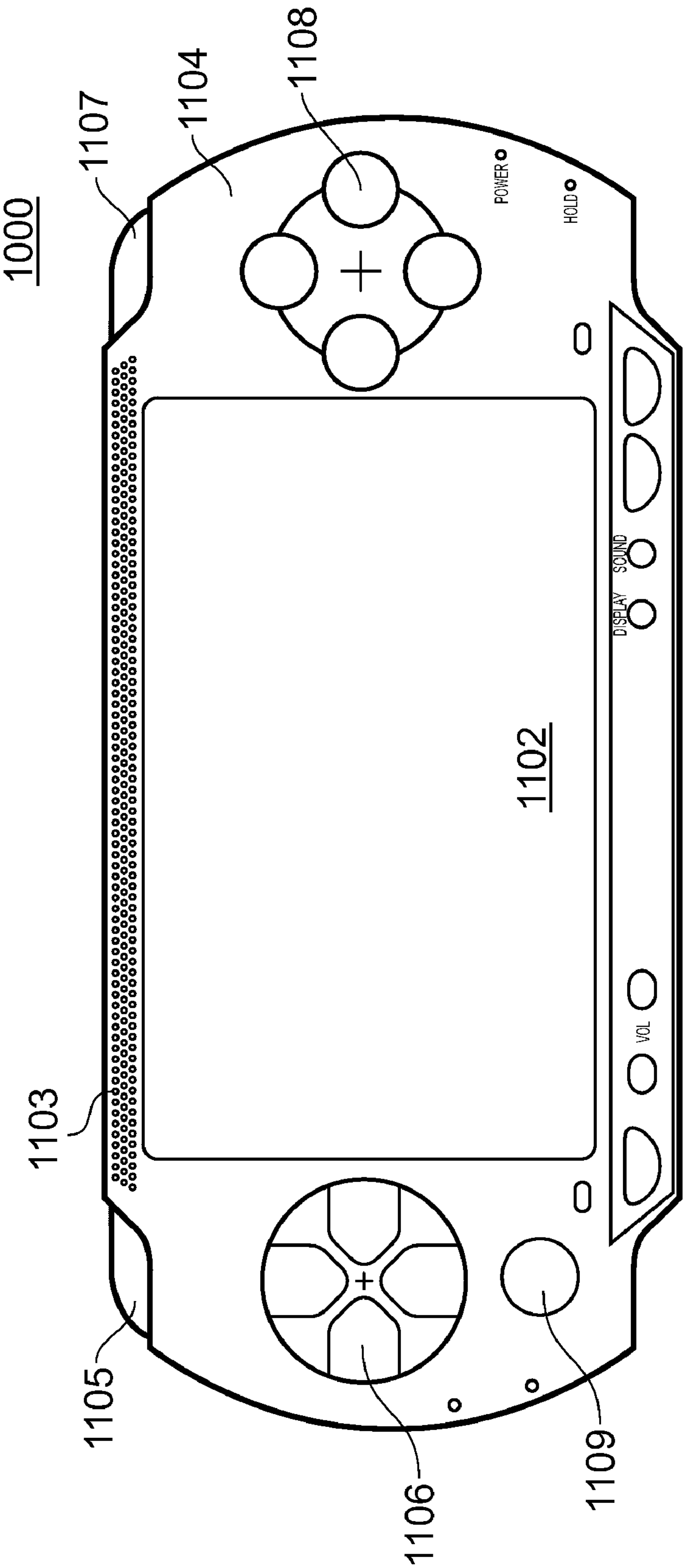
FIG. 2A is a front view of a portable entertainment device.

Referring to FIG. 2A, in an embodiment of the present invention a Sony® PlayStation Portable® (PSP) entertainment device acts as an entertainment device 1000. The PSP body 1104 comprises, inter alia, a left shoulder input button 1105, a left joypad 1106, a right shoulder input button 1107, a right joypad 1108, and an analogue input device 1109 collectively referred to as user controls. These are used to interface with software running on the PSP. In addition, the PSP comprises an integral display 1102 and a speaker 1103.

Figure 2B:
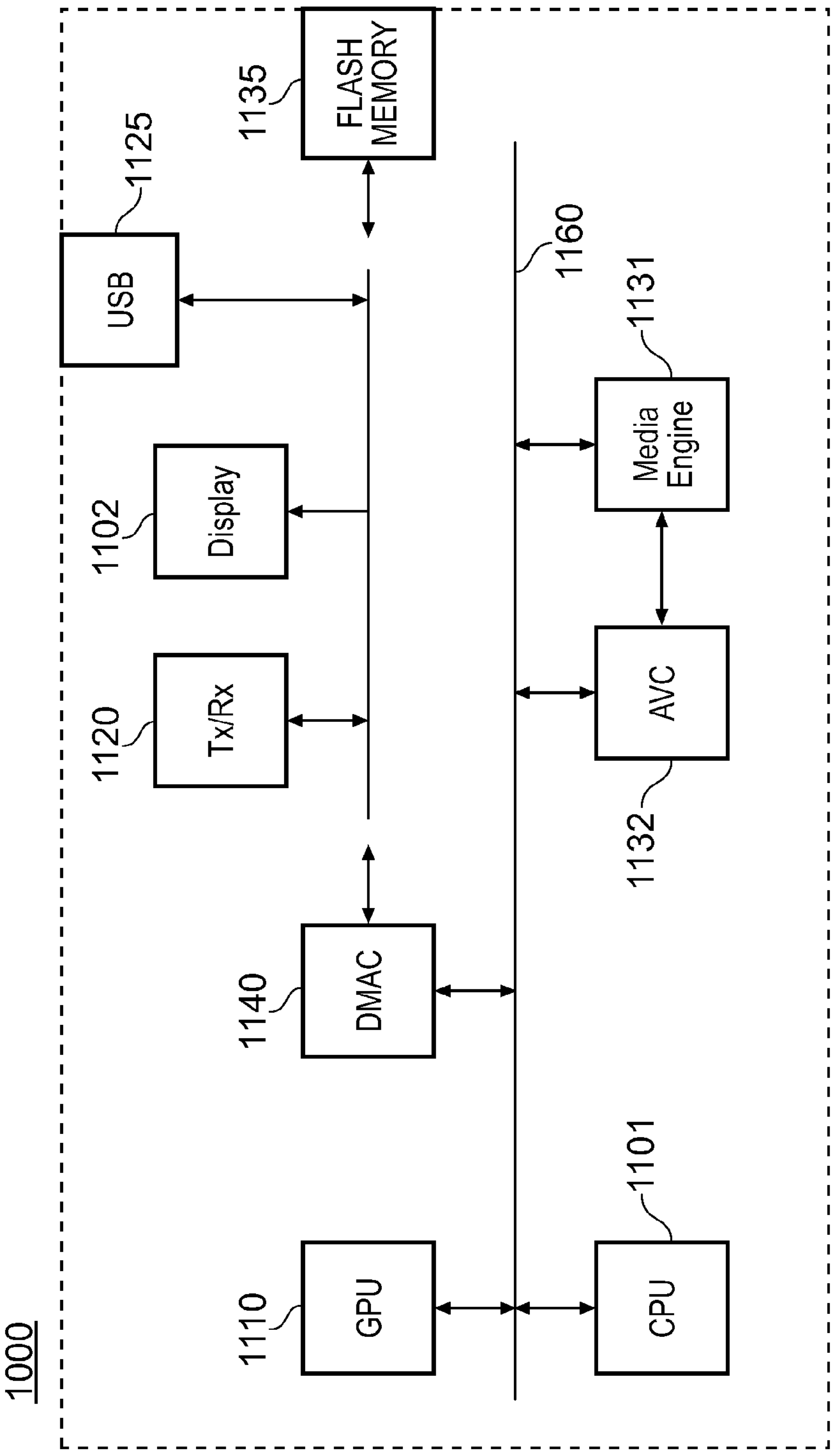
FIG. 2B is a schematic diagram of a portable entertainment device.
Figure 2C:
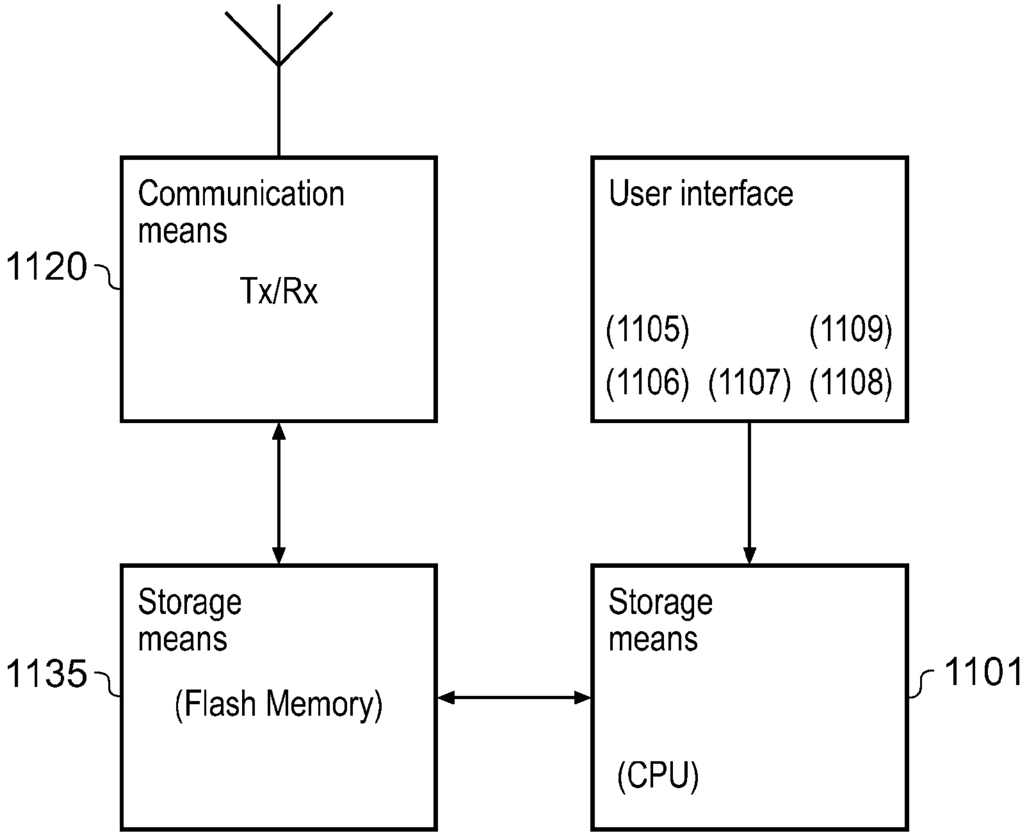
FIG. 2C is a schematic diagram of a functional arrangement of elements of a portable entertainment device.

Referring now also to FIG. 2B, a summary schematic diagram of a PSP acting as the entertainment device 1000 according to an embodiment of the invention is provided. The PSP comprises a central processing unit (CPU) 1101, a graphics processing unit (GPU) 1110 for polygon rendering and the like, a media engine 1131 and an audio/video processor (AVC) 1132 for image rendering, video and audio playback and the like, and a direct memory access controller (DMAC) 1140, linked by a common bus 1160. The DMAC 1140 also links to an external bus 1170 through which inputs and outputs are communicated, including with a wireless communication means (Tx/Rx) 1120, a USB connector 1125, a flash memory stick interface 1135 that can act as a storage means for the device, and to the integral display 1102. FIG. 2C shows a schematic view of a subset of these elements, identifying their roles in embodiments of the present invention. In particular, in the present embodiment: a communication means is embodied by the Tx/Rx 1120; a storage means is embodied by the flash memory 1135 interacting with the CPU 1101; and a user interface is embodied by the controls 1105-9, as well as potentially involving the display 1102. All operate under software control, e.g. from disc or network (e.g. wireless Internet connection).

An embodiment of the present invention in which the PSP® portable entertainment device 1000 interacts with the PS3® entertainment device 10 will now be described with reference to FIGS. 3 and 4.

Figure 3:
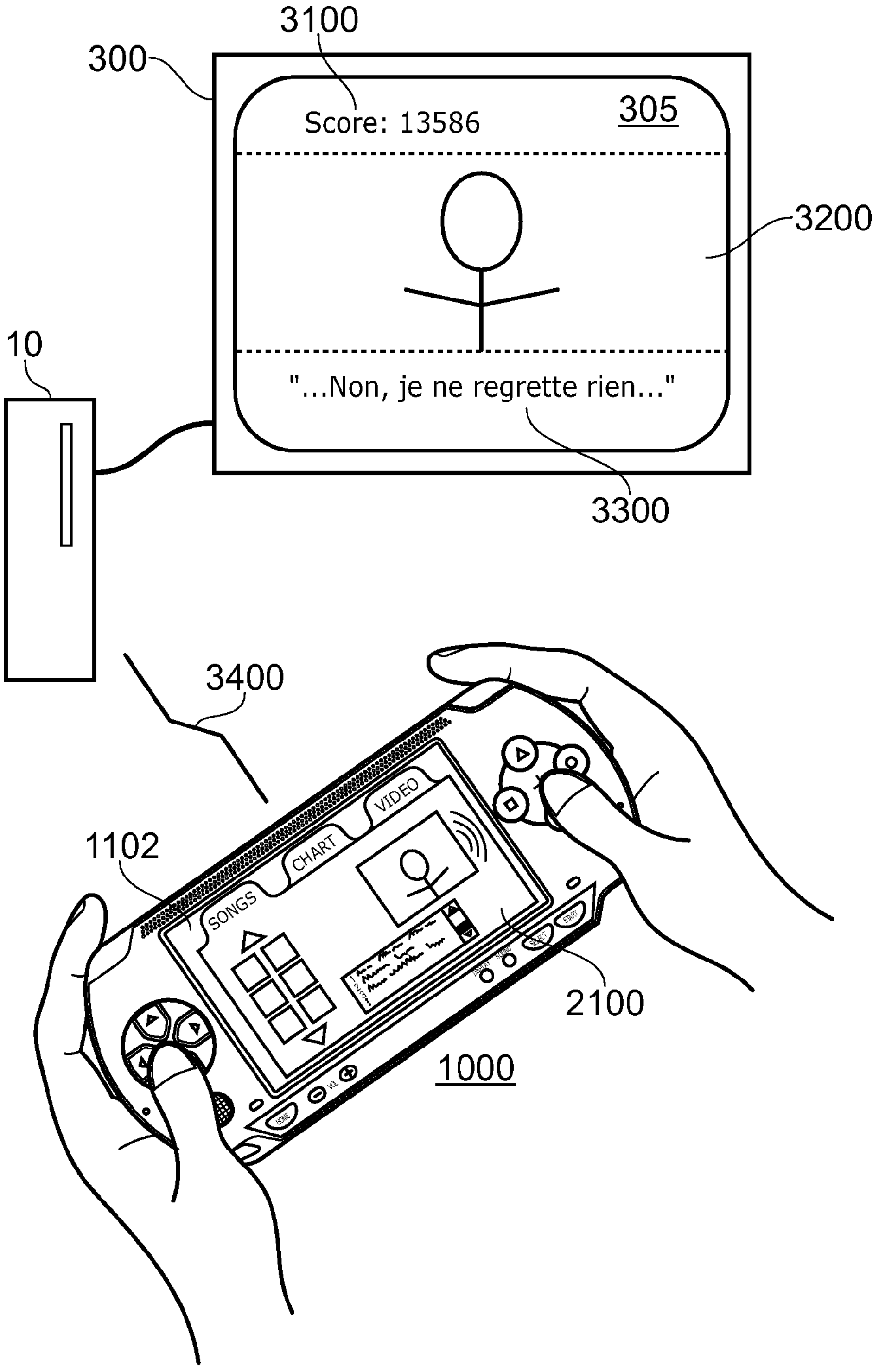
FIG. 3 is a schematic view of a portable entertainment device in wireless communication with an entertainment device in accordance with an embodiment of the present invention.
Figure 4:
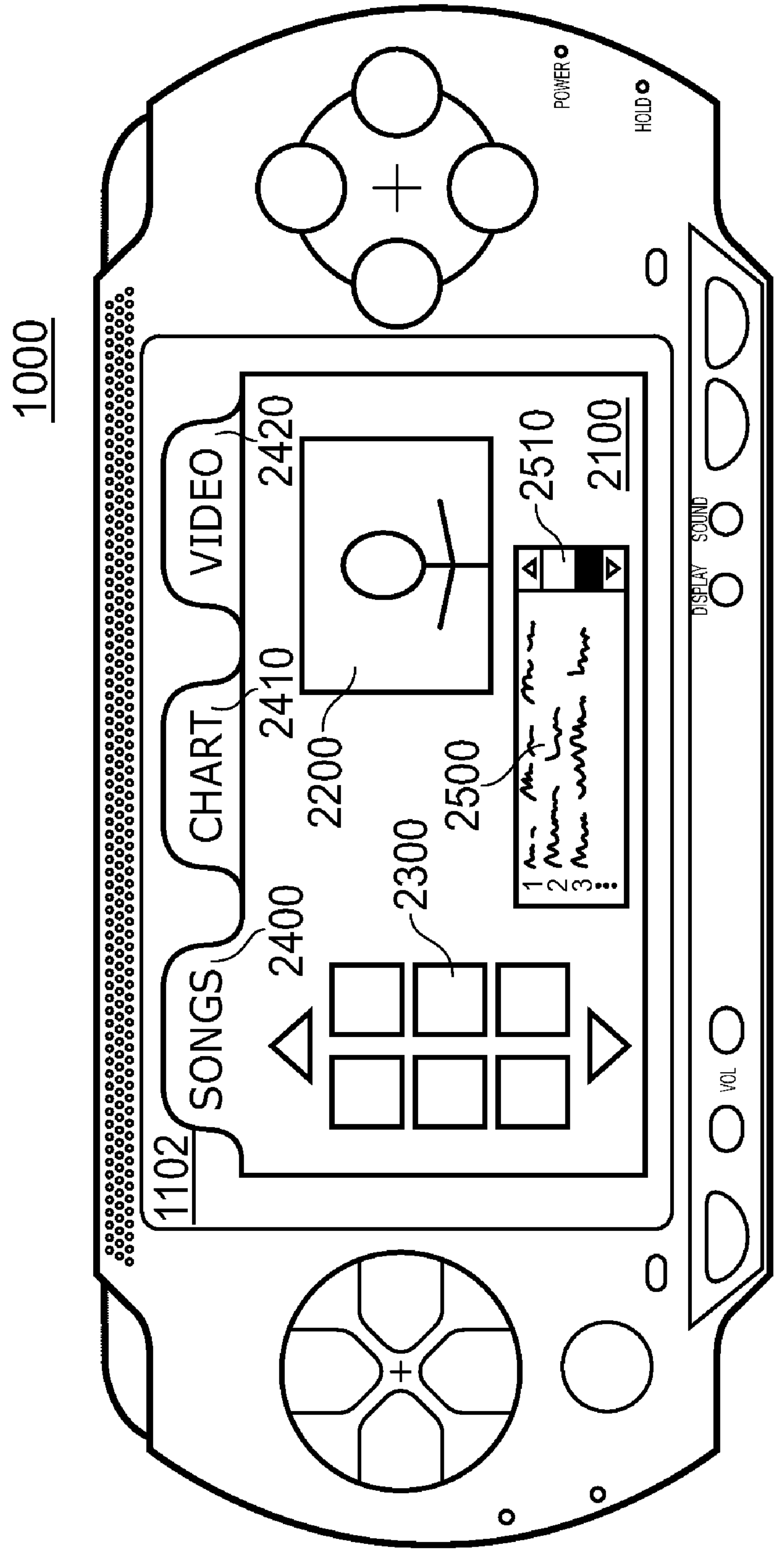
FIG. 4 is a schematic view of a portable entertainment device and a user interface in accordance with an embodiment of the present invention.

FIG. 3 shows a schematic view of the portable entertainment device 1000 in wireless communication with the system unit 10 of the PS3® entertainment device via a wireless communication link 3400 such as a Wifi or Bluetooth® link. In an embodiment of the present invention, the system unit is operable to execute karaoke game software and to output audio and video signals that cause a media item to be reproduced on the display and by the sound output device 300. In the case of a karaoke game, the system unit 10 may be operable to cause the display 305 to render video images 3200 of the original artist of a song to be sung by a user or simply a relevant or other video backing, together with an indication of the user's score 3100 and lyrics 3300 to be sung by the user. At the same time, the system unit causes the loudspeakers 310 to reproduce the backing track of the song so that the user can sing along with the song. The input from the microphone 755 may then be used by the entertainment device both to generate a game score and to play out the user's voice superimposed on the backing track. In the embodiment described with reference to FIG. 3, the media item comprises the video images 3200 together with the backing track and the lyrics 3300 although it will be appreciated that the media item could comprise any or all of: audio data; video data; and metadata (for example the lyrics 3300 and/or timing and pitch data).

During the playing of a karaoke game, once a user has reached the end of a song, if the user or users of the game wish to continue playing the game, they must select another song from a list of songs (media items) using the PS3® entertainment device. However, this selection process can break up the flow of the game. Accordingly, in embodiments of the present invention, a user may use the PSP® portable entertainment device to generate a list of songs or to select a song that should be reproduced next by the PS3® entertainment device by using a tabbed user interface 2100. Therefore, whilst a song is being sung by a user in accordance with the current song being reproduced by the PS3® entertainment device 10, the song or list of songs that has been generated by a user using the PSP® portable entertainment device 1000 can be transmitted wirelessly from the PSP® portable entertainment device 1000 to the PS3® entertainment device 10 via the wireless communication link 3400. Accordingly, once the current user has finished singing, another song will already have been selected by another user and data indicating which song is to be reproduced next will have been sent from the PSP® portable entertainment device 1000 to the PS3® entertainment device 10. Therefore, the game play can continue without a delay caused by selecting the next song to be played.

The tabbed user interface 2100 will now be described with reference to FIG. 4. As mentioned above, the tabbed user interface 2100 allows a user to select a song or songs that should be reproduced by the PS3® entertainment device 10. The tabbed user interface 2100 comprises selection tabs that allow a user to select different views that relate to the control of the portable entertainment device 1000 and allow different functions to be selected. The tabbed user interface comprises a "Songs" tab 2400, a "Chart" tab 2410, and a "Video" tab 2420. The user may operate the user controls to toggle between the tabs so as to select a function of the PSP® portable entertainment device 1000. However, it will be appreciated that any other suitable user interface could be used.

Additionally, in embodiments of the present invention, the PSP® portable entertainment device 1000 may be used to control other aspects of game play of the PS3® entertainment device 10. For example, the user could operate the PSP® portable entertainment device 1000 so as to cause control signals to be sent to the PS3® entertainment device 10 via the wireless communication link 3400 that cause the lyrics 3300 to be removed from the display 305 for a short duration such as 10 seconds so as to make singing the song more challenging for the user performing that song.

The Songs tab 2400 will now be described in more detail. The Songs tab 2400 allows a user to select a song and generate a list of songs to be reproduced by the PS3® entertainment device 10. The Songs tab comprises an available song list 2300 from which a user can select a song or songs to be reproduced, a display window 2200, and a user song list window 2500 for displaying a media list of songs selected by the user, referred to as a media list.

Typically, the list of available songs is generated by the PS3® entertainment device 10 and sent via the wireless communication link 3400 to the PSP® portable entertainment device 1000 so as to enable the PSP® portable entertainment device 1000 to display the available song list 2300. The PS3® entertainment device is operable to maintain a database of available songs such that any new songs that become available are included on the list of available songs. For example if a friend of an owner of the PS3® entertainment device 10 has access to a version of the karaoke game that has songs different from those of a version possessed by the owner, then the titles of the new songs can be included on the list of available songs.

In an embodiment of the present invention, the song list window 2500 comprises a scroll bar 2510 to allow a user to scroll through the media list. This is particularly useful if the list is too long to be displayed in entirety within the song list window 2500. In an embodiment of the invention, the display window 2200 may display a thumbnail of an image associated with a song on the available song list 2300 or video associated with that song. For example, an image of an artist who originally performed the song could be displayed. This assists the user in selecting a song to perform. Alternatively, the display window 2200 could display an image or video associated with a song on the generated list of songs. This is advantageous in that it allows the user to review their selection before transmitting their selection to the PS3® entertainment device 10 for reproduction by the PS3® entertainment device 10.

In an embodiment of the present invention, the display window 2200 may display video data received via the wireless communication link from the PS3® entertainment device 10. For example, video data captured by the video camera 756 of the current performer could be sent from the PS3® entertainment device 10 to the PSP® portable entertainment device 1000. Alternatively, the video data sent from the PS3® entertainment device 10 could comprise video data relating to the video images 3200 of the original artist of a song being sung by a user. Optionally, the video data can be sent along with audio data captured by the microphone 755 for reproduction by the speaker 1103 of the PSP® portable entertainment device 1000 as well as or instead of the audio data relating to the backing track of the current song. Therefore, a user of the PSP® portable entertainment device 1000 can view and hear the karaoke game action even if they are in a room different from a room in which the PS3® entertainment device 10 is situated. Furthermore, this assists the user in their choice of song as it allows the user to make a judgment about the relative skill of a user currently performing a song.

In operation, a user may select a song from the available song list using the user controls and add it to the media list. A user may then continue to add songs using the user controls and selecting songs from the available song list. In an embodiment of the present invention, the PSP® portable entertainment device 1000 is also operable to allow a user to edit the media list so that users can add or delete items as desired. Once the user is satisfied with the songs listed on the media list, they may use the user controls to instruct the PSP® portable entertainment device 1000 to transmit the media list from the PSP® portable entertainment device 1000 to the PS3® entertainment device 10 via the wireless communication link 3400. On receiving a media song list from the PSP® portable entertainment device 1000, the PS3® entertainment device 10 is operable to reproduce one or more songs on the media list once the reproduction of the song that is currently being reproduced has been completed. This is described later in more detail below.

In an embodiment of the present invention, media items may be stored on one or more removable storage discs or media such as a CD-ROM, DVD-ROM, or BD-ROM. However, it may be the case that a song on the media list is not stored on the removable storage medium that is being used to reproduce the current song. Therefore, the PS3® entertainment device 10 is operable to detect whether the song to be reproduced next is stored on the current removable storage medium and, if the song is not stored on the current removable storage medium, store media data relating to the current song to the HDD 400. This enables the current song to be reproduced in dependence upon the media data stored on the HDD 400 thus allowing the discs to be swapped so that a disk comprising the next media item to be reproduced can be inserted into the BD-ROM optical disk reader 430 whilst the current media item is still being reproduced.

The functionality of the charts tab 2410 and the video tab 2420 will now be described.

The chart tab 2410 (details not shown) allows a user to view a hits list of popular songs that have been recently sung by other users. Optionally, this may be displayed together with a score achieved by a user who last sang that song or a list of scores of different users who have sung that song. For example, the charts tab 2410 may display a list of the ten most popular songs (a hits list) that have previously been performed by users together with the scores each respective user achieved in performing that song as a list similar to the available song list 2300 as shown in FIG. 4. In an embodiment of the invention, the PS3® entertainment device 10 stores a list of songs that users have previously selected to sing and have been reproduced by the PS3® entertainment device. The PS3® entertainment device may then generate the hits list in dependence upon a detection of the number of times each has been selected. The hits list may then be transmitted from the PS3® entertainment device 10 to the PSP® portable entertainment device 1000 via the wireless communication link 3400. Alternatively, where the PS3® entertainment device 10 is operably connected to a game server via the internet using a suitable modem, the PS3® entertainment device 10 may send metadata relating to each song that has been reproduced to the game server so that the game server may generate the hits list from data received from a plurality of entertainment devices. The PS3® entertainment device 10 may then receive the hits list from the game server and forward it to the PSP® portable entertainment device 1000. Optionally, the hits list may be generated by the PSP® portable entertainment device 1000 in dependence upon a detection of the number of times each has been selected. The user of the PSP® portable entertainment device 1000 may select a song from the hits list and add it to the user song list as described above with reference to the songs tab 2400.

The video tab 2420 (details not shown) allows a user to view video images captured by the video camera 756 of the current performer or video data relating to the video images 3200 of the original artist of a song being sung by a user. In this case the video data is streamed from the PS3® entertainment device 10 to the PSP® portable entertainment device 1000 via the wireless communication link 3400 using known techniques. Typically, the video data is streamed on request by the user or when the user switches to the video tab 2420 although it will be appreciated that the video data could be streamed continuously so as to allow the video images to be displayed without a pause that may occur when tabbing between the video tab 2420, the chart tab 2410 and the songs tab 2400. The video data can be streamed together with audio data relating to the video data or the audio data may be streamed separately. In an embodiment of the present invention, a user may select a song from the available song list 2500 and use the user interface of the PSP® portable entertainment device 1000 to request that video data and/or audio data relating to the song be streamed to the PSP® portable entertainment device 1000 from the PS3® entertainment device 10 via the wireless communication link 3400 so that it can be reproduced by the PSP® portable entertainment device. This allows a user to preview a song on their PSP® portable entertainment device 1000 before selecting it to add to the media list.

On tabbing between the songs tab 2400, the chart tab 2410 and the video tab 2420, the functional state of the PSP® portable entertainment device for that tab is maintained by the PSP® portable entertainment device so that a user may select different tabs without the settings of the other tabs being lost or operations associated with those tabs being suspended.

In an alternative embodiment, the processing required to achieve the above functionality is carried out by the PS3® entertainment device 10. In this case, the PS3® entertainment device 10 generates the tabbed user interface 2100 together with the relevant data for display on the display screen 1102 of the PSP® portable entertainment device 1000 in response to data signals generated by the user controls of the PSP® portable entertainment device 1000 which are sent from the PSP® portable entertainment device 1000 to the PS3® entertainment device 10 via the wireless communication link 3400. In other words, data for display on the display screen 1102 of the PSP® portable entertainment device 1000 is generated by the PS3® entertainment device 10 and streamed over the wireless communication link 3400 so that the PSP® portable entertainment device 1000 acts as a dumb terminal, displaying matter which has been sent to it by the PS3® entertainment device and returning control codes indicative of PSP® portable entertainment device buttons which have been pressed.

Typically the data for display on the PSP® portable entertainment device 1000 is compressed by the PS3® entertainment device 10 using a suitable compression algorithm such as one according to the Motion Pictures Experts Group 4 (MPEG4) standard, although it will be appreciated that any suitable compression scheme could be used or that the data may not be compressed. In the case where compressed prerecorded video data, such as a karaoke video, is stored on the HDD 400 or a removable storage medium for example, the PS3® entertainment device 10 decompresses the pre-recorded video data. The PS3® entertainment device then uses the decompressed data as an image source for streaming data to the PSP® portable entertainment device 1000 separately to, or as part of, the tabbed user interface 2100 (for example for display in the video tab 2420).

Accordingly, two control techniques have been described: one in which the PSP® portable entertainment device acts as a dumb terminal, and one in which the PSP® portable entertainment device undertakes data processing to generate the tabbed display, to assemble a media list and other tasks. Clearly, other embodiments may lie between these extremes. Any of these embodiments is suitable for use in connection with the arrangement to be described with reference to FIG. 5. In this regard, it is not relevant whether the detail of the tabbed display (for example) has been generated at the PSP® portable entertainment device or the PS3® entertainment device; in either case, the interface is displayed on the PSP® portable entertainment device and is considered to be an interface associated with the PSP® portable entertainment device. Similar considerations apply to the control buttons on the PSP® portable entertainment device, in that they remain associated with the PSP® portable entertainment device irrespective of whether the interpretation of their operation is carried out at the PSP® portable entertainment device, the PS3® entertainment device or a combination of both.

The above media item reproduction process will now be described in more detail with reference to FIG. 5.

Figure 5:
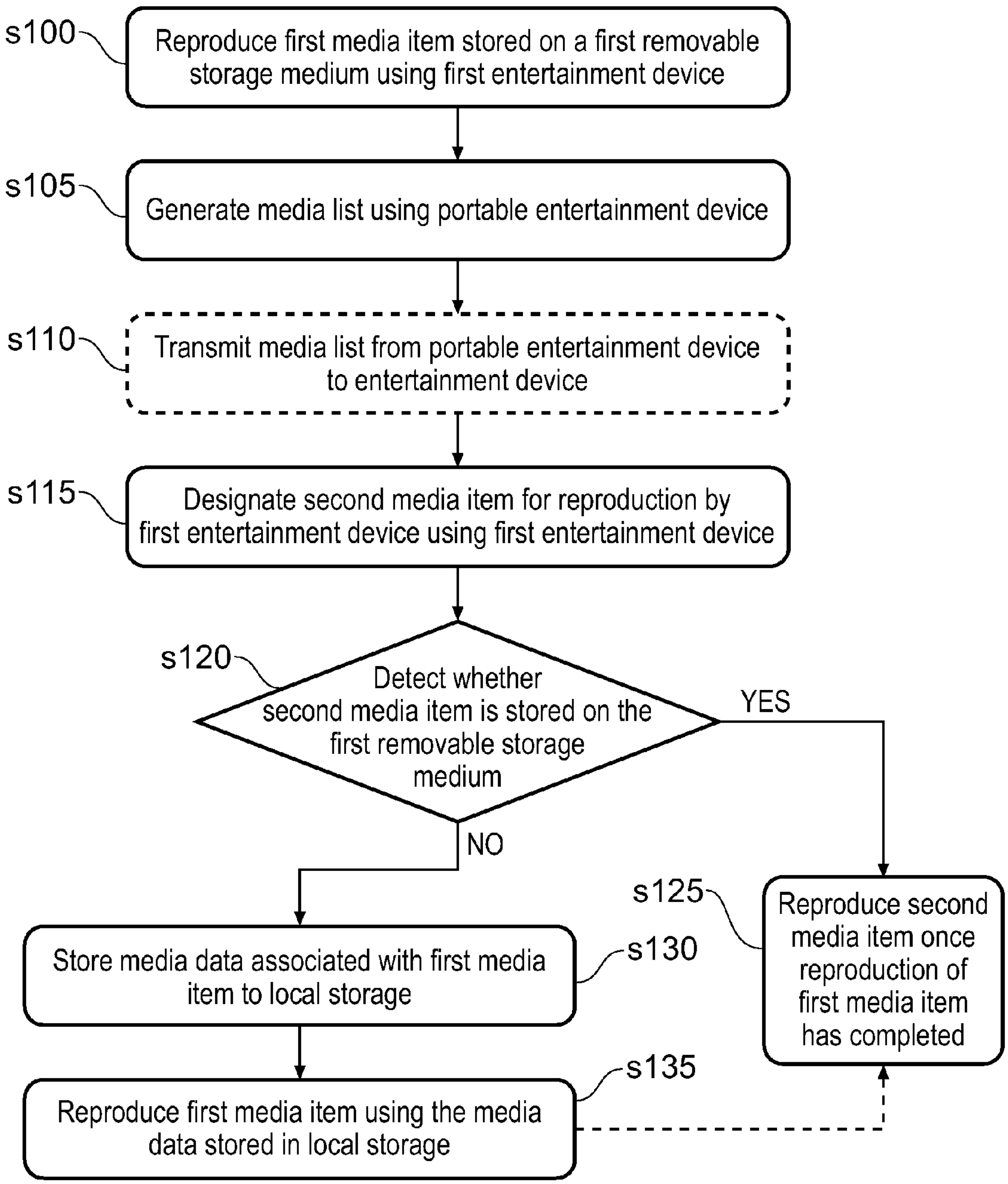
FIG. 5 is a flowchart of a method of reproducing media items in accordance with an embodiment of the present invention.

FIG. 5 is a flowchart of a method of reproducing media items in accordance with an embodiment of the present invention. At a step s100, a first media item is reproduced by the PS3® entertainment device 10 and output to the display 305 and one or more loudspeakers 310. In the case of a karaoke game, the media item may be a song optionally together with video footage of a singer and an indication of lyrics that a user is to sing as illustrated in FIG. 3. In the embodiment described with reference to FIG. 5, the first media item is stored on a first removable storage medium such as a CD-ROM, DVD-ROM, BD-ROM® and the like although it will be appreciated that any suitable removable storage medium such as a memory card, magnetic tape storage media and the like could be used.

Then, at a step s105, a user may use the tabbed user interface 2100 of the PSP® portable entertainment device 1000 to generate a media list of media items for reproduction by the PS3® entertainment device 10. The media list may comprise one or more media items. In the situation where a user only wishes to select one song to sing, the media list comprises only that media item. However, it will be appreciated that the media list could comprise any number of media items. In an embodiment of the present invention, a user may select a plurality of media items and add them to the media list as described above with reference to FIG. 4. Additionally, the user may use the tabbed user interface 2100 to sort the media items in order of preference so that, for example, a song that they would like to perform next is at the top of the list with other songs that they wish to perform later are lower in the list.

At a step s110, applicable to embodiments in which some processing of the user input data is carried out at the PSP® portable entertainment device, the media list is transmitted from the PSP® portable entertainment device 1000 to the PS3® entertainment device 10 for reception (collation) at the PS3® entertainment device via the wireless communication link 3400 whilst the first media item is being reproduced by the PS3® entertainment device. Where the PSP® portable entertainment device simply acts as a dumb terminal, the list is automatically assembled or collated at the PS3® entertainment device as the user commands are transmitted.

In an embodiment of the present invention, only one PSP® portable entertainment device 1000 is enabled so as to communicate with the PS3® entertainment device 10 via the wireless communication link 3400. This reduces the likelihood that different users each having their own PSP® portable entertainment device 1000 could simultaneously select the same song to sing and simplifies the handling of the media list by the PS3® entertainment device 10. Alternatively, two or more PSP® portable entertainment devices may be paired with the PS3® entertainment device 10. For example, teams of users could each have a respective PSP® portable entertainment device so that each team can compile a respective media list and challenge the other team to sing the songs on the media list.

In order to achieve this functionality, the PSP® portable entertainment device 1000 is initially paired with the PS3® entertainment device 10 by wired connection using one of the USB ports 710. The PSP® portable entertainment device 1000 and the PS3® entertainment device 10 each have a unique identifying code that uniquely identifies that entertainment device. When the PSP® portable entertainment device 1000 is first connected to the PS3® entertainment device 10 via the one of the USB ports 710, the unique identifying codes of each device are registered on the other respective device so that thereafter they may exclusively communicate with each other securely via the wireless communication link 3400 such as via the wireless network (Wi-Fi) port 730 or the Bluetooth® wireless link port 740. Preferably, the WiFi port 730 is used for the wireless communication link 3400 due to the higher bandwidth and range of the IEEE 802.11b/g standard as compared to the Bluetooth® standard.

At a step s115, the PS3® entertainment device 10 is operable to designate a second media item as the next media item to be reproduced after completion of reproduction of the first media item. In this case, completion of reproduction means that reproduction of the media item has finished, been stopped by a user, or any other process in which reproduction of the media item is stopped. In the case of a karaoke game for example, if a user decides they don't like a song half-way through performing that song or they decide it is too difficult for them to perform, they may stop reproduction of the song so they can start singing the next song. Therefore, although in that instance the song has not finished, reproduction of that song will be treated as having completed once the song is stopped.

The second media item is selected from the media list transmitted from the PSP® portable entertainment device 1000 to the PS3® entertainment device 10 via the wireless communication link 3400. In the case where the media list comprises one media item, that media item is designated as the second or next media item to be reproduced. However, where there are several media items on the media list, the PS3® entertainment device may designate one of the media items on the list as the next media item to be reproduced after completion of reproduction of the first media item in accordance with selection criteria.

For example, a selection criterion may be to reproduce the items in the order that they were added to the list by the user of the PSP® portable entertainment device so that the first item on the list is designated as the next item to be reproduced after completion of reproduction of the first media item, with subsequent items on the list being designated as next respective items to be reproduced after completion of reproduction of a current media item currently being reproduced. Alternatively, a selection criterion could be: the order of preference of reproduction as selected by the user of the PSP® portable entertainment device as described at the step s105; a random selection of a media item from the media list; or, where each song has an associated performance difficulty, the selection could be made in dependence upon the difficulty of performing that song. For example, the hardest song to perform on the media list could be selected as the next media item to be reproduced after completion of reproduction of the current media item. However, it will be appreciated that any other suitable selection criterion could be used. It will be appreciated that although the task of selecting the next media item is described as being carried out by the PS3® entertainment device, the actual selection could be entirely based on actions carried out by the user operating the controls of the PSP® portable entertainment device. Accordingly, in one extreme, the "selection" at the PS3® entertainment device could simply be represented by an acceptance of an instruction issued by the PSP® portable entertainment device.

It will be appreciated that the media list need not be completed or finalised by a user before the second media item is selected from the media list by the PS3® entertainment device 10. In particular, in an embodiment of the present invention, the media list can be can be modified by a user whilst a media item is actually being reproduced by the PS3® entertainment device 10. In this embodiment, the media list can be considered to be a "live" list because it can be modified and altered even though media items can still be selected from the media list for output. In this case, each time a media item is added to the media list, the media list may be transmitted from the PSP® portable entertainment device to the PS3® entertainment device 10 via the wireless communication link 3400 or the media list updated accordingly at the PS3® entertainment device 10. If the selection involves deleting (or demoting in priority of playing order) the currently playing media item, reproduction of that media item could be cancelled immediately or after a predetermined period, for example.

In the embodiment described above, in which the PS3® entertainment device 10 generates the tabbed user interface 2100 together with the relevant data for display on the display screen 1102 of the PSP® portable entertainment device 1000, the media list exists on the PS3® entertainment device 10 at all times because the PS3® entertainment device 10 carries out all the processing necessary to achieve the functionality of the tabbed user interface.

Optionally, a user may use the PS3® entertainment device 10 or the PSP® portable entertainment device 10 to generate one or more compilation media lists that may be stored on the PS3® entertainment device 10 or the PSP® portable entertainment device 10. The compilation media lists may then be used to form the media list from which media items are selected for reproduction.

At a step s120, the PS3® entertainment device 10 detects whether the second media item is stored on the first removable storage medium. This detection takes place whilst the first media item is being reproduced. In other words, the PS3® entertainment device 10 checks to see if the second media item is stored on the same removable storage medium as the first media item. Typically, the PS3® entertainment device 10 detects whether the second media item is stored on the first removable storage medium by detecting whether the second media item is listed on a table of contents (TOC) associated with the first removable storage medium, although it will be appreciated that any suitable method could be used. If the second media item is detected as being stored on the same removable storage medium as the first media item, that is on the first removable storage medium, then, at a step s125, the PS3® entertainment device reproduces the second media item once reproduction of the first media item has been completed. Alternatively, if a user decides to stop the reproduction of the first media item before reproduction of the first media item has completed, reproduction of the second media item commences once the reproduction of the first media item has stopped.

However, if the second media item is not stored on the first removable storage medium, at a step s130, the PS3® entertainment device stores media data relating to the first media item to local storage such as the hard disk drive HDD 400 or XDRAM 500. The media data allows the first media item (or more precisely, at least the yet-unplayed remainder of the first media item) to be reproduced from the local storage rather than from the first removable storage medium. The media data may therefore comprise any or all of: audio data; video data; timing data that relates to temporal points at which a user should be singing a particular note; pitch data that relates to a pitch of the notes that the user should be singing; lyrics; and copyright protection data.

It is known to buffer a short temporal period of media data read from a removable storage medium into, for example, random access memory. Accordingly, if this buffering technique is used, from the time that the second (next to be played) media item is selected, the minimum media data that needs to be stored in local storage is the remaining (unplayed) part of the first media item less any data which has already been buffered in random access memory. In a further advance, the minimum amount of media data that needs to be stored in local storage is the remaining (unplayed) part of the first media item less any data which has already been buffered in random access memory by the time that the data copying operation will have been completed. This latter enhancement requires a prediction of how long the data copying operation will take; this could be as simple as a predetermined time (e.g. 3 seconds), with the proviso that the user is not enabled to eject the removable storage medium until the later of the predetermined time and the completion of the copying operation. Or the prediction could be based on empirical results, taking into account the amount of data to be copied.

Of course, for simplicity, instead of the above arrangements the whole of the media data relating to the partly-completed media item could be copied across to local storage.

Then, at a step s135, the PS3® entertainment device continues to reproduce the first media item in dependence upon the media data stored in local storage rather than reproducing the first media item in dependence on media data stored on the first removable storage medium. This advantageously allows the first removable storage medium to be exchanged with a second removable storage medium associated with the second media item whilst the first media item is being reproduced. In an embodiment of the present invention, once the media data has been stored to local storage thus allowing the first removable storage medium to be exchanged with the second removable storage medium, the PS3® entertainment device 10 and/or the PSP® portable entertainment device 1000 may display a message such as "Discs may be changed" informing a user that the first removable storage media may be exchanged with the second removable storage medium. When reproduction of the first media item has completed, the second media item may then be reproduced at the step s125 as indicated by the dashed line in FIG. 5. Therefore, in the case of a karaoke game for example, once a user has finished performing a song that is stored on a first game disc, reproduction of the second song can commence without a pause in game play caused by having to wait until the end of the first song to insert a new game disc on which the second song is stored.

Of course it is not necessary that media item reproduction switches from the removable storage medium to the local storage as soon as the copy has been completely placed on the local storage. It is only a requirement that this switchover happens in time for the media item reproduction to continue uninterrupted when the removable storage medium is ejected or removed. So, although it is perhaps simpler to effect a switchover as soon as the data is available on the local storage, the switchover does not actually have to happen until it is needed (e.g. in response to removal of the removable storage medium)

In an embodiment of the present invention, once reproduction of the media item stored in local storage has completed, the media data relating to the that media item is deleted so as so reduce the likelihood of copying. Alternatively, the storage of the media data to local storage may be time limited such that the duration of storage is limited to a predetermined time (e.g. one hour) or the duration of the current game session, or maybe the shorter of these two. Therefore, after expiry of the relevant time period or termination of the game session, the media data relating to stored media items may then deleted. Optionally, the predetermined time period may be set by a user or determined by game software.

With regard to the second (next) media item, various possibilities exist. If a further (third) media item has already been selected and is stored on a further different removable storage medium, then the media data relating to the second media item could be copied across to local storage as soon as the second removable storage medium is inserted or mounted to the PS3® entertainment device. Or alternatively, playback of the second media item could commence from the second removable storage medium so that the choice of the (then) next media item can be finalised in the opening part of the second media item. In principle, if a list of n successive media items has been prepared, and those media items are on different respective removable discs, then up to n sets of media data could be copied to local storage to allow the seamless reproduction of the series of items. A limit could be placed on how many media items are allowed to be concurrently stored in the local storage, partly to conserve storage and also to avoid large scale copying of the media data.

With regard to discussions above of the media list being a "live" list, capable of amendment during use, the system can address what happens if, during reproduction of the first media item, a different second media item is selected in place of a previously selected second media item. The outcome differs in dependence on whether the previously selected and newly selected second media items are present on the same removable storage medium (RSM) as the currently playing first media item:

| | | | | |
|---|---|---|---|---|
| Was previously selected second media item on same RSM as first media item? | No | No | Yes | Yes |
| Is newly selected second media item on same RSM as first media item? | No | Yes | No | Yes |
| Now copy first media item to local storage? | Already copied | Already copied | Yes | No |
| Now delete locally stored copy of first media item? | No | Optionally, yes | No | Not applicable |

Although embodiments of the present invention have been described with reference to a PS3® entertainment device and a PSP® portable entertainment device it will be appreciated that any other suitable entertainment devices could be used. In particular, although a PSP® portable entertainment device has been described, it will be appreciated that a mobile telephone could be used to generate the media list or achieve similar functionality to that described with reference to FIGS. 3 to 5 such as the tabbed user interface 2100, with the communication between the mobile telephone and the PS3® entertainment device being via (for example) a Bluetooth wireless communication link.

It will be appreciated that in embodiments of the present invention, elements of the entertainment method may be implemented in the entertainment device or portable entertainment device in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for reproducing media items using a first entertainment device, the first entertainment device being operable to communicate with a portable entertainment device via a wireless communication link, and the first entertainment device comprising a media reproduction arrangement operable to reproduce one or more media items stored on a removable storage medium, the method comprising:

reproducing a first media item using the media reproduction arrangement, the first media item being stored on a first removable storage medium;

generating, using a user interface associated with the portable entertainment device, a media list of one or more media items for reproduction by the first entertainment device;

collating the media list at the first entertainment device, whilst the first media item is being reproduced by the media reproduction arrangement;

designating, at the first entertainment device, a second media item as the next media item to be reproduced by the media reproduction arrangement after completion of the reproduction of the first media item, the second media item being selected from the media list collated at the first entertainment device; and detecting, whilst the first media item is being reproduced by the media reproduction arrangement, whether the second media item is stored on the first removable storage medium, and, if the second media item is detected as not being stored on the first removable storage medium, storing media data relating to the first media item to a local storage medium, so that the first media item may be reproduced in dependence upon the media data stored in the local storage medium to allow the first removable storage medium to be exchanged with a second removable storage medium associated with the second media item whilst the first media item is being reproduced by the media reproduction arrangement.

2. A method according to claim 1, comprising the step of reproducing the first media item using media data stored in the local storage medium in response to completion of the copying of the media data to the local storage medium.

3. A method according to claim 1, comprising the step of reproducing the first media item using media data stored in the local storage medium in response to removal of the first removable storage medium from the entertainment device.

4. A method according to claim 1, comprising reproducing the second media item using the media reproduction arrangement once reproduction of the first media item by the media reproduction arrangement has been completed, in which the second media item is stored on the second removable storage medium.

5. A method according to claim 1, in which the portable entertainment device comprises a portable entertainment device media reproducer operable to reproduce one or more media items.

6. A method according to claim 5, comprising:

transmitting data relating to the first media item from the first entertainment device to the portable entertainment device via the wireless communication link;

reproducing at least a portion of the first media item at the portable entertainment device using the portable entertainment device media reproducer in dependence upon the data transmitted from the first entertainment device via the wireless communication link to the portable entertainment device.

7. A method according to claim 5, in which:

the first entertainment device is operable to generate, in response to control signals generated by the portable entertainment device, the image data related to the user interface associated with the portable entertainment device;

the portable entertainment device media reproducer is operable to display image data relating to the user interface associated with the portable entertainment device; and the method comprises transmitting the image data from the first entertainment device to the portable entertainment device via the wireless communication link so that the image data can be displayed by the portable entertainment device media reproducer.

8. A method according to claim 7, in which:

the image data comprises media data relating to the first media item; and the method comprises reproducing at least a portion of the first media item within the user interface using the portable entertainment device media reproducer in dependence upon the image data generated by the first entertainment device and transmitted from the first entertainment device via the wireless communication link to the portable entertainment device.

9. A method according to claim 1, in which the second media item is selected by the first entertainment device from the received media list in accordance with a selection criterion.

10. A method according to claim 9, in which the selection criterion is an order of preference of reproduction as selected by a user via the user interface associated with the portable entertainment device.

11. A method according to claim 9, in which the selection criterion is a random designation by the first entertainment device of a media item on the media list as the media item to be reproduced next.

12. A method according to claim 9, in which the selection criterion is an order in which media items were added to the media list via the user interface of the portable entertainment device.

13. A method according to claim 1, in which, where the media list comprises a single media item, that media item is designated by the entertainment device as the next media item to be reproduced by the media reproduction arrangement after completion of the reproduction of the first media item.

14. A method according to claim 1, comprising automatically deleting the media data relating to the first media item from the local storage medium in response to completion of reproduction of the first media item.

15. A method according to claim 1, comprising automatically deleting the media data from the local storage medium after a predetermined time period.

16. A method according to claim 15, in which the predetermined time period is set by a user of the entertainment device.

17. A method according to claim 1, comprising automatically deleting the media data from the local storage medium in response to termination of a current game session.

18. A method according to claim 1, in which the media items comprise audio data and/or video data.

19. A method according to claim 18, in which the media items are songs associated with a karaoke video game.

20. A computer program product comprising a tangible, non-transitory storage medium which stores computer software which, when executed by a computer, causes the computer to carry out a method comprising the steps of:

reproducing at least a first media item, the first media item being stored on a first removable storage medium;

communicating with a portable entertainment device via a wireless communication link;

designating a second media item as the next media item to be reproduced after completion of the reproduction of the first media item, the second media item being selected from a media list generated by user input to the portable entertainment device, the media list being a list of one or more media items for reproduction, and the media list being received from the portable entertainment device via the wireless communication link;

detecting, whilst the first media item is being reproduced, whether the second media item is stored on the first removable storage medium, and, if the second media item is detected as not being stored on the first removable storage medium, storing media data relating to the first media item to a local storage medium, so that the first media item may be reproduced in dependence upon the media data stored in the local storage medium to allow the first removable storage medium to be exchanged with a second removable storage medium associated with the second media item whilst the first media item is being reproduced.

21. An entertainment system for reproducing media items, the system comprising:

a first entertainment device comprising a media reproduction arrangement operable to reproduce at least a first media item, the first media item being stored on a first removable storage medium;

a portable entertainment device comprising a user interface, the portable entertainment device being operable to communicate with the first entertainment device via a wireless communication link;

a list generator to generate a media list of one or more media items for reproduction by the first entertainment device in dependence upon input data generated by the user interface of the portable entertainment device;

a list collator to collate the media list at the first entertainment device whilst the first media item is being reproduced by the media reproduction arrangement;

a designator arrangement to designate a second media item as the next media item to be reproduced by the media reproduction arrangement after completion of the reproduction of the first media item, the second media item being selected from the media list collated at the first entertainment device; and a detector to detect, whilst the first media item is being reproduced by the media reproduction arrangement, whether the second media item is stored on the first removable storage medium, and, if the second media item is detected as not being stored on the first removable storage medium, to store media data relating to the first media item to a local storage medium; in which:

the media reproduction arrangement is operable to reproduce the first media item in dependence upon the media data stored in the local storage medium so as to allow the first removable storage medium to be exchanged with a second removable storage medium associated with the second media item whilst the first media item is being reproduced by the media reproduction arrangement.

22. An entertainment device for reproducing media items, the device comprising:

a media reproduction arrangement operable to reproduce at least a first media item, the first media item being stored on a first removable storage medium;

a wireless communicator operable to communicate with a portable entertainment device via a wireless communication link;

a designator to designate a second media item as the next media item to be reproduced by the media reproduction arrangement after completion of the reproduction of the first media item, the second media item being selected from a media list generated by user input to the portable entertainment device, the media list being a list of one or more media items for reproduction by the entertainment device, and the media list being transmitted from the portable entertainment device to the entertainment device via the wireless communication link; and a detector to detect, whilst the first media item is being reproduced by the media reproduction arrangement, whether the second media item is stored on the first removable storage medium, and, if the second media item is detected as not being stored on the first removable storage medium, to store media data relating to the first media item to a local storage medium; in which:

the media reproduction arrangement is operable to reproduce the first media item in dependence upon the media data stored in the local storage medium so as to allow the first removable storage medium to be exchanged with a second removable storage medium associated with the second media item whilst the first media item is being reproduced by the media reproduction arrangement.

* * * * *